(12) United States Patent
Ll

(10) Patent No.: US 12,308,970 B2
(45) Date of Patent: May 20, 2025

(54) HARQ-ACK FEEDBACK METHOD AND APPARATUS, AND COMMUNICATION DEVICE

(71) Applicant: BEIJING XIAOMI MOBILE SOFTWARE CO., LTD., Beijing (CN)

(72) Inventor: Mingju Ll, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 17/777,014

(22) PCT Filed: Nov. 19, 2019

(86) PCT No.: PCT/CN2019/119521
§ 371 (c)(1),
(2) Date: May 13, 2022

(87) PCT Pub. No.: WO2021/097682
PCT Pub. Date: May 27, 2021

(65) Prior Publication Data
US 2022/0407628 A1 Dec. 22, 2022

(51) Int. Cl.
H04L 1/18 (2023.01)
H04L 1/1812 (2023.01)
H04L 5/00 (2006.01)

(52) U.S. Cl.
CPC .......... H04L 1/1812 (2013.01); H04L 5/0046 (2013.01); H04L 5/0053 (2013.01)

(58) Field of Classification Search
CPC ... H04L 1/1812; H04L 5/0046; H04L 5/0053; H04L 1/1614; H04L 1/1671;
(Continued)

(56) References Cited

U.S. PATENT DOCUMENTS 10,063,352 B2   8/2018  Liu et al.
2012/0044871 A1* 2/2012  Li ........................ H04L 5/0094
                                                             370/328
(Continued)

FOREIGN PATENT DOCUMENTS

CN   101488832 A    7/2009
CN   101873706 A   10/2010
(Continued)

OTHER PUBLICATIONS

International Search Report of PCT/CN2019/119521 dated Jun. 24, 2020 with English translation, (4p).
(Continued)

Primary Examiner — Luat Phung
(74) Attorney, Agent, or Firm — Arch & Lake LLP; Hao Tan; Shen Wang

(57) ABSTRACT

The present disclosure provides a Hybrid Automatic Repeat Request Acknowledgement (HARQ-ACK) feedback method, which is applied to a terminal and includes: sending feedback information according to a receiving condition of downlink data, wherein the feedback information includes: carrier reception indication information and HARQ-ACK information; wherein the carrier reception indication information is used for indicating that the terminal receives the downlink data on a first carrier and/or does not receive the downlink data on a second carrier; and the HARQ-ACK information is feedback information of the downlink data received on the first carrier.

20 Claims, 8 Drawing Sheets

Base station

Terminal

Step S310: sending feedback information to the base station according to a reception condition of downlink data, wherein the feedback information includes carrier reception indication information and Hybrid Automatic Repeat Request Acknowledgement (HARQ-ACK) information; and wherein the carrier reception indication information is used to indicate that the downlink data is received on a first carrier by the terminal and/or the downlink data is not received on a second carrier by the terminal; and the HARQ-ACK information is feedback information of the downlink data received on the first carrier

(58) Field of Classification Search
CPC ... H04L 1/1896; H04L 5/0055; H04L 5/0094; H04L 1/1822; H04W 72/12
See application file for complete search history.

(56) References Cited

U.S. PATENT DOCUMENTS

| | | | |
|---|---|---|---|
| 2017/0070988 A1* | 3/2017 | Aiba | H04B 1/7087 |
| 2018/0352570 A1* | 12/2018 | Sun | H04L 5/0053 |
| 2020/0008076 A1* | 1/2020 | Peng | H04W 72/51 |
| 2020/0136751 A1* | 4/2020 | Guo | H04L 27/26025 |
| 2021/0226740 A1* | 7/2021 | Lei | H04L 1/1864 |

FOREIGN PATENT DOCUMENTS

| | | |
|---|---|---|
| CN | 102468940 A | 5/2012 |
| CN | 106788936 A | 5/2017 |
| CN | 107925990 A | 4/2018 |
| WO | 2016119207 A | 8/2016 |

OTHER PUBLICATIONS

First Office Action of the Chinese Application No. 201980003088.3, issued on Apr. 25, 2022 with English translation, (19p).

* cited by examiner

| Carrier 1 | 0 | 1 | 2 | 3 | 4 | 5 | 6 | 7 |
|---|---|---|---|---|---|---|---|---|
| Carrier 2 | 0 | 1 | 2 | 3 | 4 | 5 | | |
| Carrier 3 | 0 | 1 | 2 | 3 | 4 | | | |
| Carrier 4 | | | | | | | | |

HARQ-ACK FEEDBACK METHOD AND APPARATUS, AND COMMUNICATION DEVICE

CROSS-REFERENCE

The present application is a U.S. National Stage of International Application No. PCT/CN2019/119521, filed on Nov. 19, 2019, the entire content of which is incorporated herein by reference for all purposes.

TECHNICAL FIELD

The present disclosure relates to, but is not limited to, the field of wireless communication technologies, and in particular to a method and apparatus for HARQ-ACK feedback, and a communication device.

BACKGROUND

In the New Radio in Unlicensed Spectrum (NR-U) technologies, there is a one shot Hybrid Automatic Repeat Request Acknowledgement (HARQ-ACK) feedback manner. In this feedback manner, each time a terminal feeds back HARQ-ACK information, it needs to feed back HARQ-ACK feedback information of all Hybrid Automatic Repeat Request (HARQ) processes at one time.

SUMMARY

The present disclosure disclose a method and apparatus for HARQ-ACK feedback, and a communication device.

According to a first aspect of the present disclosure, there is provided a method for HARQ-ACK feedback, the method is applied to a terminal and includes:
  sending feedback information according to a reception condition of downlink data, wherein the feedback information includes carrier reception indication information and Hybrid Automatic Repeat request acknowledgement (HARQ-ACK) information; and
  wherein the carrier reception indication information is used to indicate that the downlink data is received on a first carrier by the terminal and/or the downlink data is not received on a second carrier by the terminal; and the HARQ-ACK information is feedback information of the downlink data received on the first carrier.

According to a second aspect of the present disclosure, there is also provided a method for HARQ-ACK feedback, the method is applied to a base station and includes:
  receiving feedback information, wherein the feedback information includes carrier reception indication information and HARQ-ACK information;
  determining that downlink data is received on a first carrier by a terminal and/or the downlink data is not received on a second carrier by the terminal according to the carrier reception indication information; and
  determining a reception condition of the downlink data received on the first carrier according to the HARQ-ACK information.

According to a third aspect of the embodiments of the present disclosure, there is provided a communication device, including:
  an antenna;
  a memory; and
  a processor, coupled to the antenna and the memory, respectively, configured to control the antenna to send and receive a wireless signal by executing an executable program stored on the memory, and capable of executing steps of the method for HARQ-ACK feedback provided by any of the foregoing technical solutions.

DETAILED DESCRIPTION

Figures 1, 2:
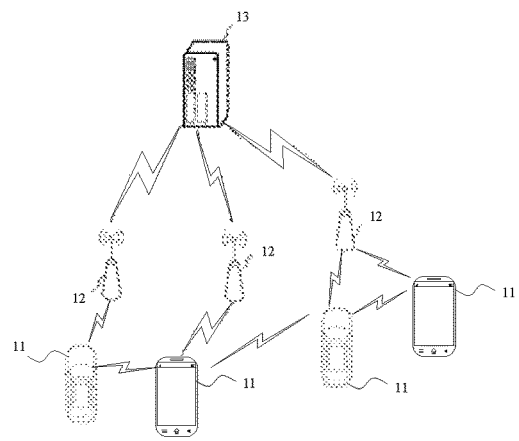
FIG. 1 is a schematic structural diagram of a wireless communication system according to one or more examples of the present disclosure.
FIG. 2 is a schematic diagram of a downlink data transmission according to one or more examples of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with some aspects of the embodiments of the present disclosure as recited in the appended claims.

The terms used in the embodiments of the present disclosure are merely for the purpose of describing particular embodiments and are not intended to limit the embodiments of the present disclosure. As used in the embodiments of the present disclosure and the appended claims, the singular forms "a" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the embodiments of the present disclosure to describe various information, such information should not be limited to these terms. These terms are only used to distinguish the same type of information from each other. For example, without departing from the scope of the embodiments of the present disclosure, first information may also be referred to as second information, and similarly, the second information may also be referred to as the first information. Depending on the context, the word "if" as used herein can be interpreted as "upon" or "when" or "in response to determination".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Reference is made to FIG. 1, which shows a schematic structural diagram of a wireless communication system according to an embodiment of the present disclosure. As illustrated in FIG. 1, the wireless communication system is a communication system based on cellular mobile communication technologies. The wireless communication system may include several terminals 11 and several base stations 12.

The terminal 11 may refer to a device that provides voice and/or data connectivity to a user. The terminal 11 may communicate with one or more core networks via a radio access network (RAN). The terminal 11 can be an Internet of Things terminal, such as a sensor device, a mobile phone (or a "cellular" phone) and a computer with the Internet of Things terminal. The terminal may be, for example, a fixed, portable, pocket-sized, handheld, built-in computer or vehicle-mounted device, such as a station (STA), a subscriber unit, a subscriber station, a mobile station, a mobile, a remote station, an access point, a remote terminal, an access terminal, a user terminal, a user agent, a user device, or a user equipment (UE). Or, the terminal 11 may also be a device of an unmanned aerial vehicle. Or, the terminal 11 may also be a vehicle-mounted device, such as a trip computer with a wireless communication function, or a wireless communication device connected to an external trip computer. Or, the terminal 11 may also be a roadside device, such as a streetlight, a signal light or another roadside device with a wireless communication function.

The base station 12 can be a network-side device in a wireless communication system. The wireless communication system can be a 4th generation mobile communication (4G) system, also known as a long-term evolution (LTE) system. Or, the wireless communication system may also be a 5G system, also known as a new radio (NR) system or a 5G NR system. Or, the wireless communication system may also be a next-generation system of 5G system. An access network in the 5G system can be referred to as a new generation-radio access network (NG-RAN) or a MTC system.

The base station 12 can be an evolved NodeB (eNB) in the 4G system. Or, the base station 12 may also be a gNB with a central distributed architecture in the 5G system. When the base station 12 adopts the central distributed architecture, it usually includes a central unit (CU) and at least two distributed units (DUs). The CU is provided with a protocol stack of a packet data convergence protocol (PDCP) layer, a radio link control (RLC) layer, and a media access control (MAC) layer. The DU is provided with a protocol stack of a physical (PHY) layer. A specific implementation of the base station 12 is not limited in the embodiments of the present disclosure.

A wireless connection can be established between the base station 12 and the terminal 11 through a radio air interface. In different implementations, the radio air interface is a radio air interface based on a 4th generation mobile communication network technology (4G) standard. Or, the radio air interface is a radio air interface based on a 5th generation mobile communication network technology (5G) standard, such as an NR. Or, the radio air interface may also be a radio air interface based on a 5G next-generation mobile communication network technology standard.

In some embodiments, an end to end (E2E) connection may also be established between the terminals 11, such as a vehicle to vehicle (V2V) communication, a vehicle to infrastructure (V2I) communication and a vehicle to pedestrian (V2P) communication in a vehicle to everything (V2X) communication, and other scenarios.

In some embodiments, the above wireless communication system may further include a network management device 13.

The several base stations 12 are connected to the network management device 13, respectively. The network management device 13 can be a core network device in the wireless communication system. For example, the network management device 13 can be a mobility management entity (MME) in an evolved packet core (EPC) network. Or, the network management device may also be another core network device, such as a serving gateway (SGW), a public data network gateway (PGW), a policy and charging rules function (PCRF) unit or a home subscriber server (HSS). An implementation form of the network management device 13 is not limited in the embodiments of the present disclosure.

In order to better understand the technical solutions described in any of the embodiments of the present disclosure, a method for one shot HARQ-ACK feedback is described in an embodiment first.

In the embodiment, each time a terminal feeds back HARQ-ACK information, it feeds back HARQ-ACK feedback information of all HARQ processes at one time. Here, all the HARQ processes include scheduled HARQ processes and unscheduled HARQ processes. For example, when the maximum number of downlink HARQ processes is configured as sixteen, the terminal needs to feed back HARQ-ACK information of the sixteen HARQ processes every time feeding back the HARQ-ACK information.

If a base station configures a plurality of carriers for the terminal, the terminal needs to feed back HARQ-ACK information of all configured HARQ processes of the plurality of carriers to the base station each time performing HARQ-ACK feedback. For example, if the base station configures M carriers for the terminal, and each carrier is configured with K downlink HARQ processes, then the terminal needs to feed back HARQ-ACK information of M*K HARQ processes to the base station each time sending the HARQ-ACK feedback information. Here, both M and K are positive integers greater than 0. As shown in FIG. 2, the base station configures four carriers for the terminal, which are carrier 1, carrier 2, carrier 3 and carrier 4, respectively. Each carrier is configured with eight downlink HARQ processes with process numbers "0", "1", "2", "3", "4", "5", "6", and "7" respectively. Assuming that HARQ-ACK information of each HARQ process corresponds to one bit, the terminal needs to feed back 4*8=32 bits each time performing the one shot HARQ-ACK feedback.

Although the base station configures the plurality of carriers for the terminal, it does not mean that it is necessary for the terminal to transmit downlink data on each carrier in a certain period of time. For example, as shown in FIG. 2, there is no downlink data transmission on carrier 4. In a Physical Downlink Shared Channel (PDSCH) transmission range corresponding to the one shot HARQ-ACK feedback which is to be performed by the terminal, there may be no corresponding downlink data transmission on some carriers at all, or the terminal does not receive a corresponding PDSCH data block on some carriers at all. For example, it is possible that the base station sends one or several PDSCH data blocks on a carrier, but the terminal misses the detection of the one or several PDSCH data blocks. If the terminal also needs to feed back the HARQ-ACK information of all the K HARQ processes for the carrier on which no PDSCH data block transmission is actually received within the corresponding PDSCH transmission range, a great waste of transmission resources will be caused.

It should be noted that, the transmission range here may be a range where a resource used by the base station for T times of PDSCH scheduling is located. Each PDSCH scheduling may correspond to one HARQ process, and the T times of PDSCH scheduling may correspond to T HARQ processes, where T is a positive integer greater than or equal to 1. For example, the transmission range is a range where a resource used by the base station for eleven times of PDSCH scheduling is located. Here, the eleven times of PDSCH scheduling may correspond to eleven consecutive HARQ processes. For example, the eleven times of PDSCH scheduling include a total of eleven consecutive HARQ processes numbered 1 to 11. Here, a value of T can be adjusted. For example, the value of T may be "5", "8", "11", etc. The base station may determine the value of T based on a PDSCH scheduling algorithm that keeps the highest scheduling efficiency.

Figure 3:
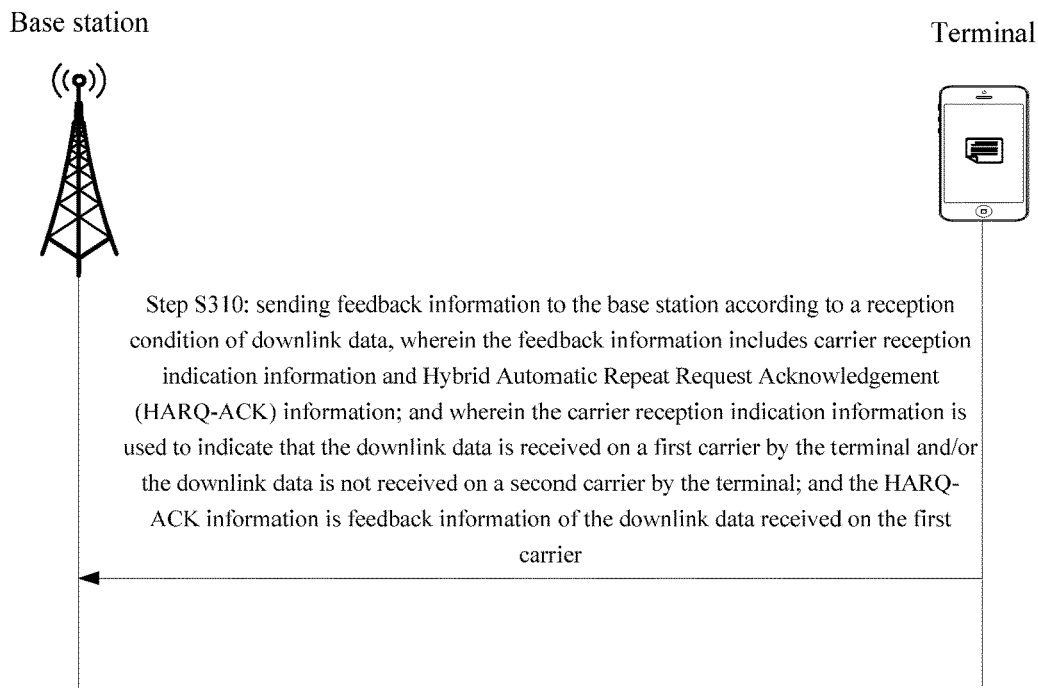
FIG. 3 is a schematic diagram of a method for HARQ-ACK feedback according to one or more examples of the present disclosure.

As shown in FIG. 3, an embodiment of the present disclosure provides a method for HARQ-ACK feedback, which is applied to a terminal, and the method includes:

in step S310, feedback information is sent to a base station according to a reception condition of downlink data, and the feedback information includes carrier reception indication information and HARQ-ACK information; and the carrier reception indication information is used to indicate that the downlink data is received on a first carrier by the terminal and/or the downlink data is not received on a second carrier by the terminal; and the HARQ-ACK information is feedback information of the downlink data received on the first carrier.

In the embodiment, the terminal may be a mobile terminal; and the base station and the terminal may be Machine Type Communication (MTC) devices in a MTC system.

In the embodiment, the downlink data may be a Transmission Block (TB) sent by the base station to the terminal. Here, the downlink data may be a data transmission block containing information content; and different transmission blocks may contain different information content. Here, the reception condition may refer to information on whether the terminal receives the downlink data. Determining whether the terminal receives the downlink data may be determining whether the terminal receives the downlink data on a carrier configured for the terminal by the base station. For example, as shown in FIG. 2, the terminal may confirm that the downlink data is received on carrier 1, carrier 2, and carrier 3, but no downlink data is received on carrier 4.

In the embodiment, as shown in FIG. 2, the first carrier is a carrier on which the UE has received the downlink data, such as carrier 1, carrier 2, and carrier 3. The second carrier is a carrier on which the UE does not receive the downlink data, such as carrier 4. Here, the carrier reception indication information may indicate the carrier on which the downlink data is received and the carrier on which the downlink data is not received through a bit value. For example, carriers configured by the base station for the terminal include carrier 1, carrier 2, carrier 3 and carrier 4, and the carrier reception indication information indicates that the downlink data is received on the first carrier and/or the downlink data is not received on the second carrier through four bits. When the downlink data is received on a corresponding carrier, a bit corresponding to this carrier can take a value of "1", and when no downlink data is received on the carrier, a bit corresponding to this carrier can take a value of "0". When values of respective bits in the four bits are "1", "1", "1", "0" (that is, encoded as "1110"), the carrier reception indication information is used to indicate that the downlink data is received on carrier 1, carrier 2 and carrier 3, but no downlink data is received on carrier 4. Here, carrier 1, carrier 2 and carrier 3 are the aforementioned first carrier, and carrier 4 is the aforementioned second carrier. After receiving the feedback information sent by the terminal, the base station can determine the reception condition of the downlink data on each carrier based on the carrier reception indication information.

In an embodiment, the carrier reception indication information performs the indication through the bit, and each bit may indicate one carrier. When a corresponding bit of the carrier reception indication information is "1", the corresponding carrier can be the first carrier, and the HARQ-ACK information may include HARQ-ACK feedback information of all HARQ-ACK processes on the first carrier corresponding to this bit. When the corresponding bit of the carrier reception indication information is "0", the corresponding carrier can be the second carrier, and the HARQ-ACK information may not include HARQ-ACK feedback information of any HARQ-ACK process on the second carrier corresponding to this bit. In this way, for the second carrier on which the UE does not received the downlink data, the UE will not feed back the HARQ-ACK information corresponding to the HARQ-ACK process on the second carrier, which reduces overhead of the HARQ-ACK feedback information. In addition, the base station decodes M (taking M as an example) bits by receiving a first encoded sequence corresponding to the carrier reception indication information, and then learns the number of bits of HARQ-ACK information indicated by a second encoded sequence corresponding to the HARQ-ACK information according to the number of bits with the value of "1" in the M bits, thereby accurately decoding the second encoded sequence. In addition, the base station can know which carrier corresponds to the HARQ-ACK information according to a sequence of "0" and "1" of M bits. For example, when values of the decoded M bits are "1101", it can be known that the HARQ-ACK information includes HARQ-ACK feedback information of three carriers. Assuming that the number of downlink HARQ processes on each carrier is eight, and each HARQ process corresponds to one bit of HARQ-ACK feedback information, then the number of bits of the HARQ-ACK information is 3*8*1=24. Moreover, the HARQ-ACK information includes the HARQ-ACK feedback information corresponding to carrier 1, carrier 2 and carrier 4.

In the embodiment, the first carrier is a general reference to a carrier on which the UE has received the downlink data, and may include one or more carriers. The carriers configured by the base station for the terminal include carrier 1, carrier 2, carrier 3 and carrier 4. If the terminal receives the downlink data on carrier 1, carrier 2 and carrier 3, the feedback information of the downlink data received on the first carrier includes the feedback information of the downlink data received on carrier 1, carrier 2 and carrier 3. Here, the feedback information of the downlink data received on the first carrier includes the feedback information of the HARQ process configured by the base station for the first carrier of the terminal. For example, as shown in FIG. 2, the base station configures four carriers for the terminal, and each carrier is configured with eight HARQ processes. The first carrier includes carrier 1, carrier 2 and carrier 3, and the feedback information of the downlink data received on the first carrier includes feedback information of 24 HARQ processes. The feedback information of each HARQ process may include N or A, where N is an abbreviation of a non-acknowledgment indicator NACK, which is used to represent a data reception status that the terminal does not successfully receive the corresponding downlink data, and A is an abbreviation of an acknowledgement indicator ACK, which is used to represent the data reception status that the terminal has successfully received the corresponding downlink data. Here, a plurality of HARQ processes may be supported. For example, up to eight HARQ processes can be supported. Each scheduled transmission block may correspond to one HARQ process. Each HARQ process needs to be marked with a HARQ process number. For example, the eight HARQ processes require eight HARQ process numbers for marking, and the eight HARQ processes may be marked by HARQ process numbers "0", "1", "2", "3", "4", "5", "6", and "7" in sequence. For example, the base station sends four transmission blocks to the terminal through carrier 1, the HARQ processes on carrier 1 are HARQ processes numbered "0", "1", "2", and "3", respectively, and the feedback information corresponding to the four HARQ processes is AAAN, which represents that the terminal confirms that three transmission blocks are received, and one transmission block is not properly received. The base station may determine the reception condition of the downlink data on the first carrier after receiving the HARQ-ACK feedback information sent by the terminal.

In an embodiment, the base station may configure M (M is a positive integer greater than or equal to 0) carriers for the terminal, and a one shot HARQ-ACK feedback manner is configured. In the one shot HARQ-ACK feedback manner, the terminal reports M bits through the carrier reception indication information, and the M bits correspond to M carriers, respectively, which are used to indicate whether there is the downlink data transmission (or PDSCH scheduling) on respective carriers. For example, when the bit value is "0", it indicates that there is no downlink data transmission, and when the bit value is "1", it indicates that there is the downlink data transmission. For the first carrier with the PDSCH scheduling in a corresponding PDSCH transmission time interval in the one shot HARQ-ACK feedback manner, its corresponding bit in the M bits may be set to "1", and the terminal will feed back the HARQ-ACK feedback corresponding to all downlink HARQ processes configured on the first carrier. For the second carrier without the PDSCH scheduling, its corresponding bit in the M bits may be set to "0", and the terminal will not feed back the HARQ-ACK feedback corresponding to any downlink HARQ process configured on the second carrier.

In the embodiments of the present disclosure, the feedback information is sent to the base station according to the reception condition of the downlink data, and the feedback information includes the carrier reception indication information and the HARQ-ACK information. The carrier reception indication information is used to indicate that the downlink data is received on the first carrier by the terminal and/or the downlink data is not received on the second carrier by the terminal. Here, the carrier reception indication information indicates that the downlink data is received on the first carrier by the terminal and/or the downlink data is not received on the second carrier by the terminal. After receiving the feedback information, the base station can accurately determine whether the downlink data is received on each carrier. The HARQ-ACK information is the feedback information of the downlink data received on the first carrier. Here, the feedback information sent to the base station is the feedback information of the downlink data received on the first carrier, and does not include the feedback information of the downlink data not received on the second carrier. On the one hand, since the carrier reception indication information has already indicated the reception condition that the downlink data is not received on the second carrier, the base station can determine a condition that the downlink data is not received on the second carrier based on the carrier reception indication information, which is equivalent to the feedback of the downlink data reception condition, and the terminal does not need to feed back the HARQ-ACK information of the HARQ-ACK process on the second carrier, which reduces a large number of bits occupied upon the transmission of HARQ-ACK information and saves signaling overhead. On the other hand, after receiving the feedback information, the base station can accurately determine the downlink data received on the first carrier based on the HARQ-ACK information.

Figure 4:
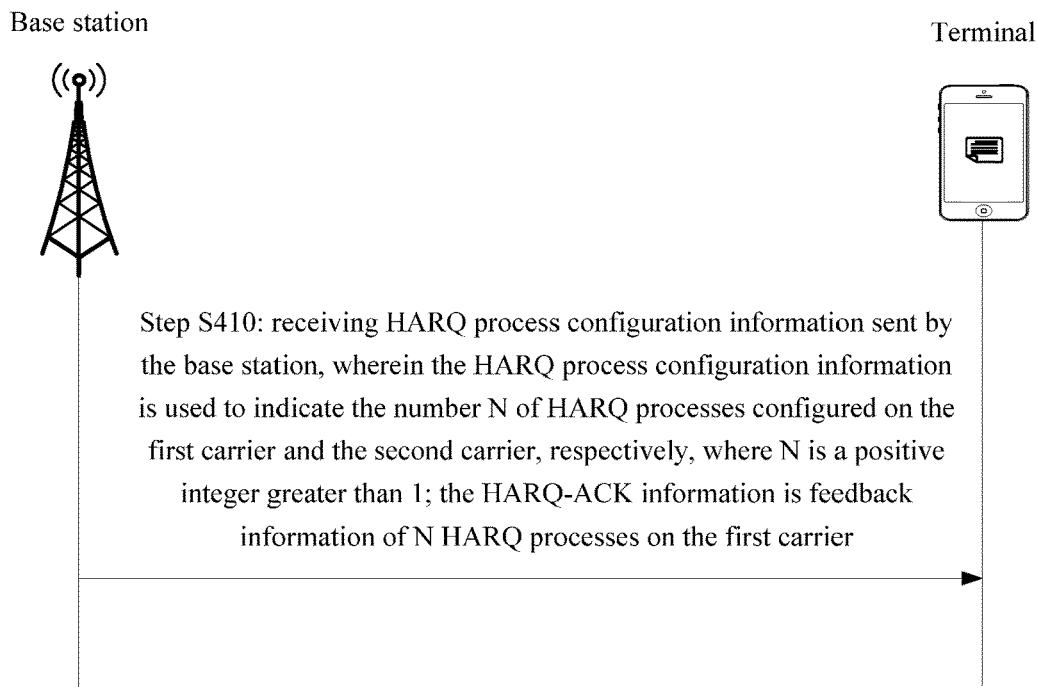
FIG. 4 is a schematic diagram of a method for HARQ-ACK feedback according to one or more examples of the present disclosure.

As shown in FIG. 4, an embodiment of the present disclosure provides a method for HARQ-ACK feedback, which is applied to the terminal, and the method further includes:

in step S410, HARQ process configuration information sent by the base station is received, and the HARQ process configuration information is used to indicate the number N of HARQ processes configured on the first carrier and the second carrier, respectively, where N is a positive integer greater than 1, and the HARQ-ACK information is feedback information of N HARQ processes on the first carrier.

In an embodiment, the reception of the HARQ process configuration information may be before sending the feedback information to the base station. Here, during a process of sending the feedback information to the base station, the HARQ process configuration information sent by the base station may also be received and the HARQ process configuration information is updated.

In the embodiment, the HARQ process configuration information may be information for configuring the HARQ process for each carrier. The HARQ process configuration information may include the number N of HARQ processes configured on each carrier. For example, each carrier can be configured with eight or sixteen HARQ processes. Here, it should be noted that the maximum number N of processes configured on each carrier may be the same or different. For example, carrier 1 is configured with eight HARQ processes, and carrier 2 is configured with sixteen HARQ processes. As shown in FIG. 2, the base station configures eight HARQ processes for each carrier, and numbers of the eight HARQ processes correspond to "0", "1", "2", "3", "4", "5", "6" and "7", respectively. Here, the HARQ-ACK information may refer to feedback information of whether the downlink data is received on the first carrier. For example, each transmission block corresponds to one HARQ process, and the HARQ-ACK information may refer to feedback information of whether the transmission block is received on the first carrier. As shown in FIG. 2, eight HARQ processes are configured on carrier 1, and there may be feedback information of the eight HARQ processes. It should be noted that the first carrier here includes carrier 1, carrier 2, and carrier 3, and the HARQ-ACK information includes the feedback information of a total of 24 HARQ processes on carrier 1, carrier 2, and carrier 3. After receiving the feedback information sent by the terminal, the base station can determine a downlink data transmission condition on each carrier based on the HARQ-ACK information.

Figure 5:
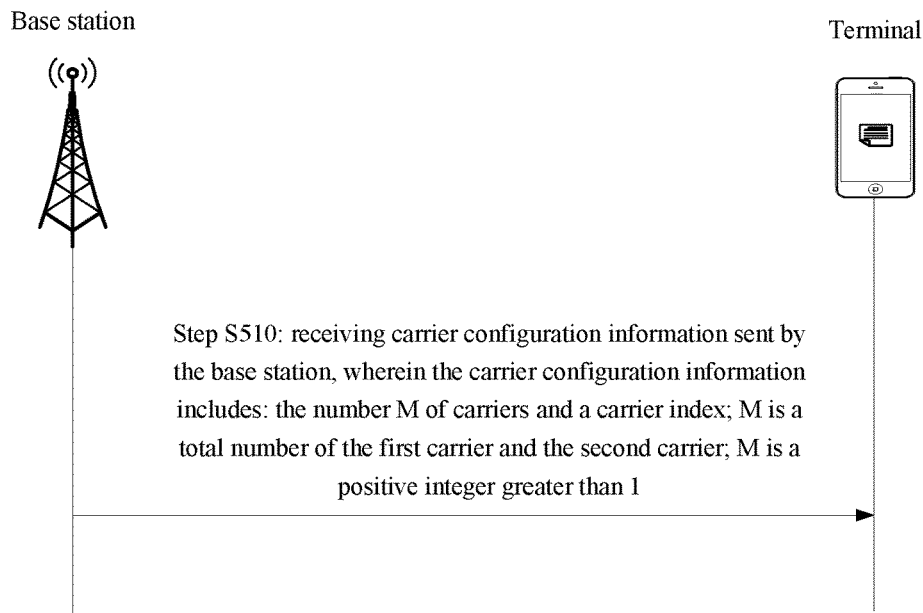
FIG. 5 is a schematic diagram of a method for HARQ-ACK feedback according to one or more examples of the present disclosure.

As shown in FIG. 5, an embodiment of the present disclosure provides a method for HARQ-ACK feedback, which is applied to the terminal, and the method further includes:

in step S510, carrier configuration information sent by the base station is received, and the carrier configuration information includes: the number M of carriers and a carrier index, and M is a total number of the first carrier and the second carrier, where M is a positive integer greater than 1.

In an embodiment, the reception of the carrier configuration information sent by the base station may be before sending the feedback information to the base station. Here, during the process of sending the feedback information to the base station, the carrier configuration information sent by the base station may also be received and the carrier configuration information may be updated.

In the embodiment, the carrier configuration information may be information for configuring a carrier resource used for the data transmission between the base station and the terminal by the base station. The base station can uniformly configure the number of carriers. For example, as shown in FIG. 2, four carriers are configured by the base station, which are carrier 1, carrier 2, carrier 3 and carrier 4, respectively. When performing carrier configuration, the base station selects several of the carriers to send data by indicating the carrier index in scheduling information, while no data is sent on the rest of the carriers. The carrier index may be set by an index bit. For example, when index bits are set to "001", "010", "011", "100", carriers with the carrier indexes of "001", "010", "011" and "100" can be selected to send the data.

In the embodiment, the terminal may arrange the carrier reception indication information and the HARQ-ACK information in an order of carrier indexes, and then encode the carrier reception indication information and the HARQ-ACK information, respectively, to obtain the encoded feedback information. After receiving the encoded feedback information sent by the terminal, the base station decodes the feedback information to obtain the carrier reception indication information and the HARQ-ACK information. Since the carrier reception indication information indicates that the terminal has received the downlink data on the first carrier and/or does not receive the downlink data on the second carrier, the base station can determine whether the downlink data is received on each carrier used for data transmission based on the order of carrier indexes after receiving the feedback information. For the first carrier on which the downlink data is received, the base station may further determine a specific reception condition of the downlink data on each first carrier based on the order of carrier indexes. For example, four carriers are used for downlink data transmission, each carrier is configured with eight HARQ processes, a code corresponding to the carrier reception indication information is "1011", and a code corresponding to the HARQ-ACK information is "11110111 11111111 01111111". The base station may determine that the carriers on which the downlink data is received by the terminal are carrier 1, carrier 3, and carrier 4, and no downlink data is received on carrier 2 based on the order of carrier indexes. In addition, based on the code corresponding to the HARQ-ACK information, the base station may determine that "11110111" is the feedback information corresponding to the HARQ processes configured on carrier 1, "11111111" is the feedback information corresponding to the HARQ processes configured on carrier 3, and "01111111" is the feedback information corresponding to the HARQ processes configured on carrier 4. The code can be obtained in different encoding manners according to different encoding rules, and codes obtained in different encoding manners can be different.

Figure 6:
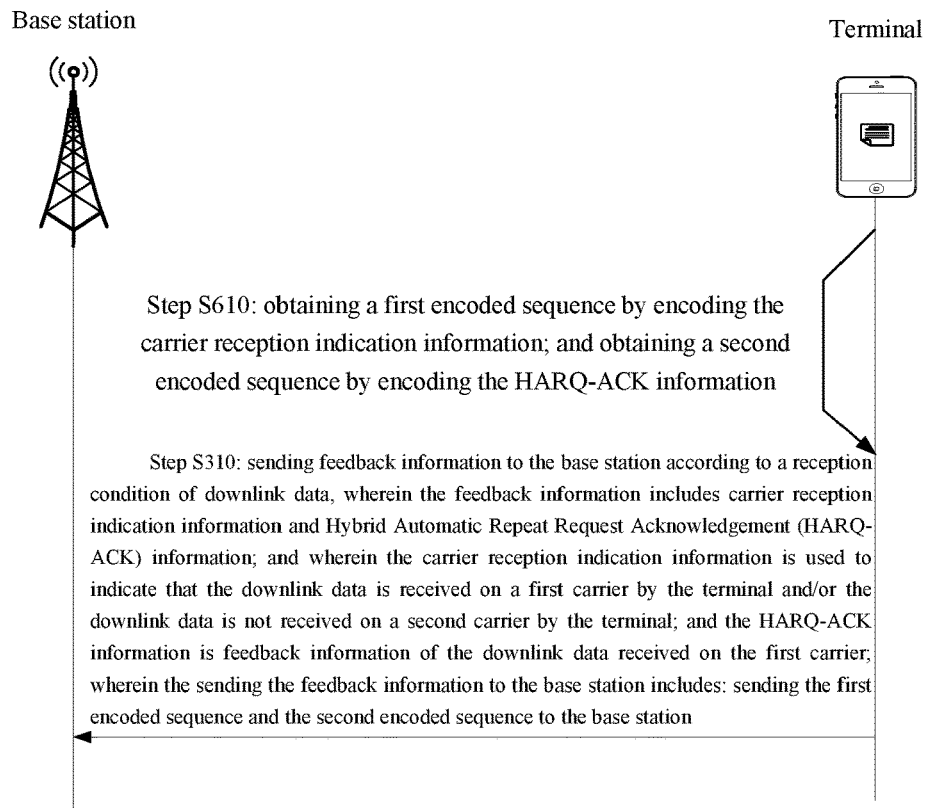
FIG. 6 is a schematic diagram of a method for HARQ-ACK feedback according to one or more examples of the present disclosure.

As shown in FIG. 6, an embodiment of the present disclosure provides a method for HARQ-ACK feedback, which is applied to the terminal, and the method further includes:

in step S610, a first encoded sequence is obtained by encoding the carrier reception indication information, and a second encoded sequence is obtained by encoding the HARQ-ACK information;

in the step S310, the sending the feedback information to the base station includes:

sending the first encoded sequence and the second encoded sequence to the base station.

In the embodiment, the first encoded sequence and the second encoded sequence are encoded sequences which are separately encoded. For example, the number M of carriers=4, the number of HARQ processes on each carrier is sixteen, and there are three carriers on which the HARQ process is scheduled, then the four bits corresponding to the carrier reception indication information need to be encoded separately from the 48 bits corresponding to the HARQ-ACK information to obtain the first encoded sequence and the second encoded sequence which are different. Here, the first encoded sequence and the second encoded sequence may be encoded using different encoding rules.

Here, the first encoded sequence may be encoded together with other encoded sequences other than the second encoded sequence. The first encoded sequence may also be encoded separately. Here, the separate encoding may mean that the encoding is performed so that the first encoded sequence only indicates the carrier reception indication information without indicating other types of information. Here, the carrier reception indication information and the HARQ-ACK information are encoded into the first encoded sequence and the second encoded sequence, respectively. In this way, the base station can accurately know the number of bits of the HARQ-ACK information corresponding to the second encoded sequence according to the M bits decoded from the first encoded sequence (here, taking the decoded bits as M bits as an example), thereby enabling the correct decoding the bits of the second encoded sequence to obtain the HARQ-ACK information.

In the embodiment, the carrier reception indication information includes M bits;
  a bit in the M bits corresponding to the first carrier has a first bit value; and
  a bit in the M bits corresponding to the second carrier has a second bit value.

Here, the first bit value is different from the second bit value. For example, the first bit value takes the value of "1", and the second bit value takes the value of "0". As shown in FIG. 2, when the first encoded sequence corresponds to four bits and is encoded as "1110", after receiving the encoded sequence sent by the terminal, the base station can determine a condition of receiving the downlink data on carrier 1, carrier 2, carrier 3 and carrier 4 by the terminal based on different values of respective bits of the first encoded sequence. Here, since the code is "1110", the base station can determine that the terminal has received the downlink data on carrier 1, carrier 2 and carrier 3, and the terminal does not receive the downlink data on carrier 4.

In the embodiment, the HARQ-ACK information corresponding to the first carrier is sorted according to an ascending order of a carrier index of the first carrier.

Here, the HARQ-ACK information corresponding to the first carrier is sorted according to the ascending order of the carrier index of the first carrier in the HARQ-ACK information. For example, carrier indexes of first carriers are "001", "010" and "011", the HARQ-ACK information corresponding to the first carrier with the carrier index "001" is "01111111", the HARQ-ACK information corresponding to the first carrier with the carrier index "010" is "11111111", and the HARQ-ACK information corresponding to the first carrier with the carrier index "011" is "11110111". Then the encoded sequence of the HARQ-ACK information obtained by sorting the HARQ-ACK information corresponding to the first carrier according to the ascending order of the carrier indexes of the first carriers is "01111111 11111111 11110111". The HARQ-ACK information is sorted according to the ascending order of the carrier indexes of the first carriers to facilitate the decoding by the base station. The HARQ-ACK information of each first carrier is accurately obtained based on the order of the carrier indexes. The code can be obtained in different encoding manners according to different encoding rules, and codes obtained in different encoding manners can be different.

Figure 7:
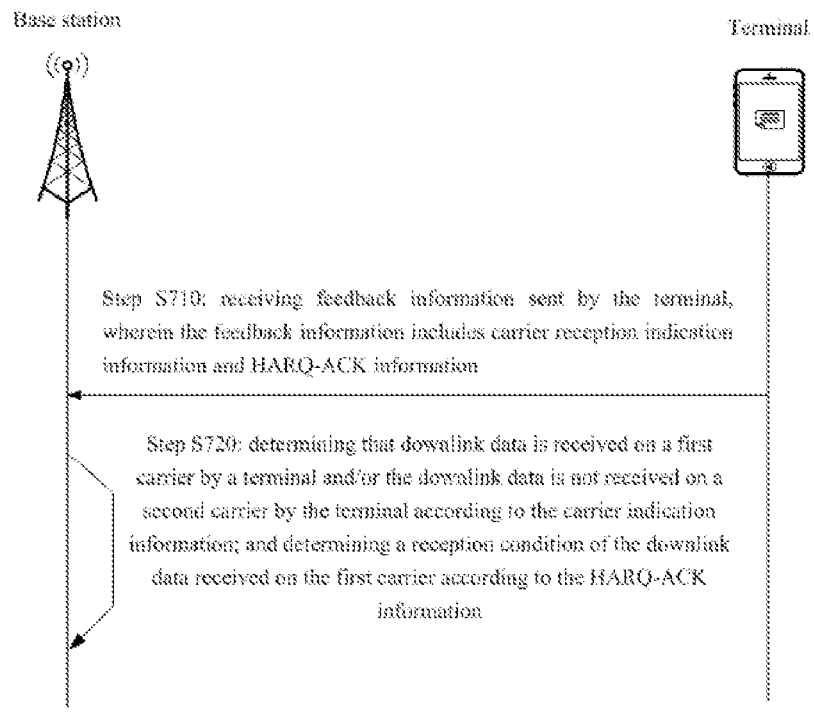
FIG. 7 is a schematic diagram of a method for HARQ-ACK feedback according to one or more examples of the present disclosure.

As shown in FIG. 7, an embodiment of the present disclosure provides a method for HARQ-ACK feedback, which is applied to a base station, and the method includes steps S710 to S720.

In the step S710, feedback information sent by a terminal is received, and the feedback information includes carrier reception indication information and HARQ-ACK information.

In the embodiment, the terminal may be a mobile terminal; and the base station and the terminal may be Machine Type Communication (MTC) devices in a MTC system.

In the step S720, it is determined that downlink data is received on a first carrier by the terminal and/or the downlink data is not received on a second carrier by the terminal according to the carrier reception indication information; and a reception condition of the downlink data received on the first carrier is determined according to the HARQ-ACK information.

In the embodiment, the downlink data may be a Transmission Block (TB) sent by the base station to the terminal. Here, the downlink data may be a data transmission block containing information content; and different transmission blocks may contain different information content. Here, the reception condition may refer to information on whether the terminal receives the downlink data. Determining whether the terminal receives the downlink data may be determining whether the terminal receives the downlink data on a carrier configured for the terminal by the base station. For example, as shown in FIG. 2, the terminal may confirm that the downlink data is received on carrier 1, carrier 2, and carrier 3, but no downlink data is received on carrier 4.

In the embodiment, as shown in FIG. 2, the first carrier is a carrier on which the downlink data is received, such as carrier 1, carrier 2, and carrier 3. The second carrier is a carrier on which the downlink data is not received, such as carrier 4. Here, the carrier reception indication information may indicate the downlink data is received on the first carrier and/or the downlink data is not received on the second carrier through a bit value. For example, carriers configured by the base station for the terminal include carrier 1, carrier 2, carrier 3 and carrier 4, and the carrier reception indication information indicates that the downlink data is received on the first carrier and/or the downlink data is not received on the second carrier through four bits. When the downlink data is received on a corresponding carrier, a bit corresponding to this carrier can take a value of "1", and when no downlink data is received on the carrier, a bit corresponding to this carrier can take a value of "0". When values of respective bits in the four bits are "1", "1", "1", "0" (that is, encoded as "1110"), the carrier reception indication information is used to indicate that the downlink data is received on carrier 1, carrier 2 and carrier 3, but no downlink data is received on carrier 4. Here, carrier 1, carrier 2 and carrier 3 are the aforementioned first carrier, and carrier 4 is the aforementioned second carrier. After receiving the feedback information sent by the terminal, the base station can determine the reception condition of the downlink data on each carrier based on the carrier reception indication information.

In an embodiment, the carrier reception indication information performs the indication through the bit, and each bit may indicate one carrier. When a corresponding bit of the carrier reception indication information is "1", the corresponding carrier can be the first carrier, and the HARQ-ACK information may include HARQ-ACK feedback information of all HARQ-ACK processes on the first carrier corresponding to this bit. When the corresponding bit of the carrier reception indication information is "0", the corresponding carrier can be the second carrier, and the HARQ-ACK information may not include HARQ-ACK feedback information of any HARQ-ACK process on the second carrier corresponding to this bit. In this way, for the second carrier on which the UE does not received the downlink data, the UE will not feed back the HARQ-ACK information corresponding to the HARQ-ACK process on the second carrier, which reduces overhead of the HARQ-ACK feedback information. In addition, the base station decodes M (taking M as an example) bits by receiving a first encoded sequence corresponding to the carrier reception indication information, and then learns the number of bits of HARQ-ACK information indicated by a second encoded sequence corresponding to the HARQ-ACK information according to the number of bits with the value of "1" in the M bits, thereby accurately decoding the second encoded sequence. In addition, the base station can know which carrier corresponds to the HARQ-ACK information according to a sequence of "0" and "1" of M bits. For example, when values of the decoded M bits are "1101", it can be known that the HARQ-ACK information includes HARQ-ACK feedback information of three carriers. Assuming that the number of downlink HARQ processes on each carrier is eight, and each HARQ process corresponds to one bit of HARQ-ACK feedback information, then the number of bits of the HARQ-ACK information is 3*8*1=24. Moreover, the HARQ-ACK information includes the HARQ-ACK feedback information corresponding to carrier 1, carrier 2 and carrier 4.

In the embodiment, the feedback information of the downlink data received on the first carrier may be feedback information of downlink data received on a plurality of carriers. For example, the carriers configured by the base station for the terminal include carrier 1, carrier 2, carrier 3 and carrier 4. If the terminal receives the downlink data on carrier 1, carrier 2 and carrier 3, the feedback information of the downlink data received on the first carrier includes the feedback information of the downlink data received on carrier 1, carrier 2 and carrier 3. Here, the feedback information of the downlink data received on the first carrier may refer to feedback information of the HARQ process configured by the base station for the first carrier of the terminal. For example, as shown in FIG. 2, the base station configures four carriers for the terminal, and each carrier is configured with eight HARQ processes. The first carrier includes carrier 1, carrier 2 and carrier 3, and the feedback information of the downlink data received on the first carrier includes feedback information of 24 HARQ processes. The feedback information of each HARQ process may include N or A, where N is an abbreviation of a non-acknowledgment indicator NACK, which is used to represent a status that the terminal does not successfully receive the corresponding downlink data, and A is an abbreviation of an acknowledgement indicator ACK, which is used to represent the data reception status that the terminal has successfully received the corresponding downlink data. Here, a plurality of HARQ processes may be supported. For example, up to eight HARQ processes can be supported. Each scheduled transmission block may correspond to one HARQ process. Each HARQ process needs to be marked with a HARQ process number. For example, the eight HARQ processes require eight HARQ process numbers for marking, and the eight HARQ processes may be marked by HARQ process numbers "0", "1", "2", "3", "4", "5", "6", and "7" in sequence. For example, the base station sends four transmission blocks to the terminal through carrier 1, the HARQ processes on carrier 1 are HARQ processes numbered "0", "1", "2", and "3", respectively, and the feedback information corresponding to the four HARQ processes is AAAN, which represents that the terminal confirms that three transmission blocks are received, and one transmission block is not received. The base station may determine the reception condition of the downlink data on the first carrier after receiving the HARQ-ACK feedback information sent by the terminal.

In an embodiment, the base station may configure M (M is a positive integer greater than or equal to 0) carriers for the terminal, and a one shot HARQ-ACK feedback manner is configured. In the one shot HARQ-ACK feedback manner, the terminal reports M bits through the carrier reception indication information, and the M bits correspond to M carriers, respectively, which are used to indicate whether there is the downlink data transmission (or PDSCH scheduling) on respective carriers. For example, when the bit value is "0", it indicates that there is no downlink data transmission, and when the bit value is "1", it indicates that there is the downlink data transmission. For the first carrier with PDSCH scheduling in a corresponding PDSCH transmission time interval in the certain one shot HARQ-ACK feedback manner, its corresponding bit in the corresponding M bits will be set to "1", and the terminal will feed back the HARQ-ACK feedback corresponding to all downlink HARQ processes configured on the first carrier. For the second carrier without PDSCH scheduling, its corresponding bit in the corresponding M bits will be set to "0", and the terminal will not feed back the HARQ-ACK feedback corresponding to any downlink HARQ process configured on the second carrier.

In the embodiments of the present disclosure, the feedback information sent by the terminal is received, and the feedback information includes the carrier reception indication information and the HARQ-ACK information. According to the carrier reception indication information, it is determined that the terminal has received the downlink data on the first carrier and/or does not receive the downlink data on the second carrier. Here, the carrier reception indication information indicates that the downlink data has been received on the first carrier by the terminal and/or the downlink data has not been received on the second carrier by the terminal. After receiving the feedback information, the base station can accurately determine whether the downlink data is received on each carrier. The reception condition of the downlink data received on the first carrier is determined according to the HARQ-ACK information. Here, the feedback information sent to the base station is the feedback information of the downlink data received on the first carrier, and does not include the feedback information of the downlink data not received on the second carrier. On the one hand, since the carrier reception indication information has already indicated the reception condition that the downlink data is not received on the second carrier, the base station can determine a condition that the downlink data is not received on the second carrier based on the carrier reception indication information, which is equivalent to the feedback of the downlink data reception condition, and the terminal does not need to feed back the HARQ-ACK information of the HARQ-ACK process on the second carrier, which reduces a large number of bits occupied upon the transmission of HARQ-ACK information and saves signaling overhead. On the other hand, after receiving the feedback information, the base station can accurately determine the downlink data received on the first carrier based on the HARQ-ACK information.

Figure 8:
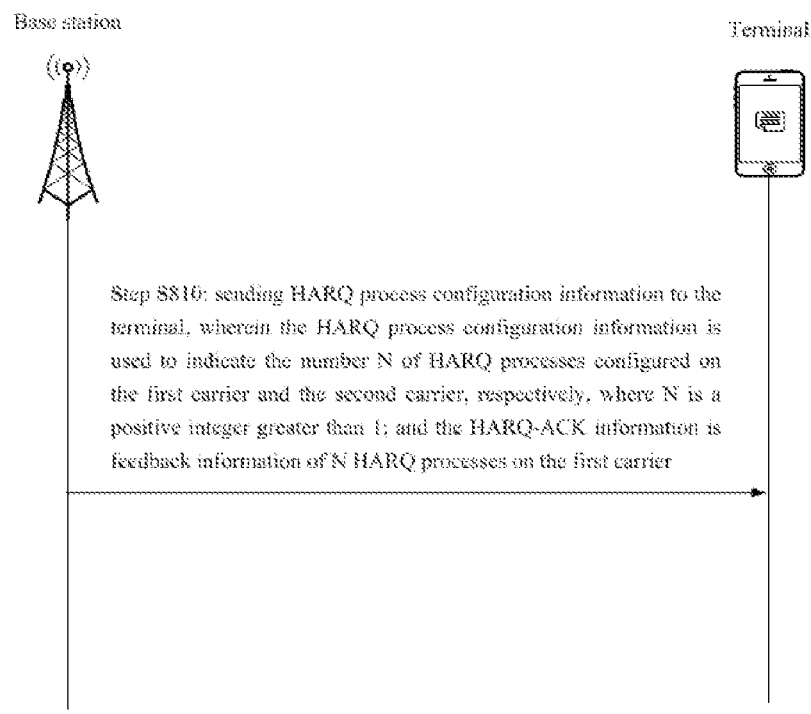
FIG. 8 is a schematic diagram of a method for HARQ-ACK feedback according to one or more examples of the present disclosure.

As shown in FIG. 8, an embodiment of the present disclosure provides a method for HARQ-ACK feedback, and the method further includes:

in step S810, HARQ process configuration information is sent to the terminal, and the HARQ process configuration information is used to indicate the number N of HARQ processes configured on the first carrier and the second carrier, respectively, where N is a positive integer greater than 1, and the HARQ-ACK information is feedback information of N HARQ processes on the first carrier.

In the embodiment, the HARQ process configuration information may be information for configuring the HARQ process for each carrier. The HARQ process configuration information may include the number N of HARQ processes configured on each carrier. For example, each carrier can be configured with eight or sixteen HARQ processes. Here, it should be noted that the maximum number N of processes configured on each carrier may be the same or different. For example, carrier 1 is configured with eight HARQ processes, and carrier 2 is configured with sixteen HARQ processes. As shown in FIG. 2, the base station configures eight HARQ processes for each carrier, and numbers of the eight HARQ processes correspond to "0", "1", "2", "3", "4", "5", "6" and "7", respectively. Here, the HARQ-ACK information may refer to feedback information of whether the downlink data is received on the first carrier. For example, each transmission block corresponds to one HARQ process, and the HARQ-ACK information may refer to feedback information of whether the transmission block is received on the first carrier. As shown in FIG. 2, eight HARQ processes are configured on carrier 1, and there may be feedback information of the eight HARQ processes. It should be noted that the first carrier here includes carrier 1, carrier 2, and carrier 3, and the HARQ-ACK information includes the feedback information of a total of 24 HARQ processes on carrier 1, carrier 2, and carrier 3. After receiving the feedback information sent by the terminal, the base station can determine a downlink data transmission condition on each carrier based on the HARQ-ACK information.

Figure 9:
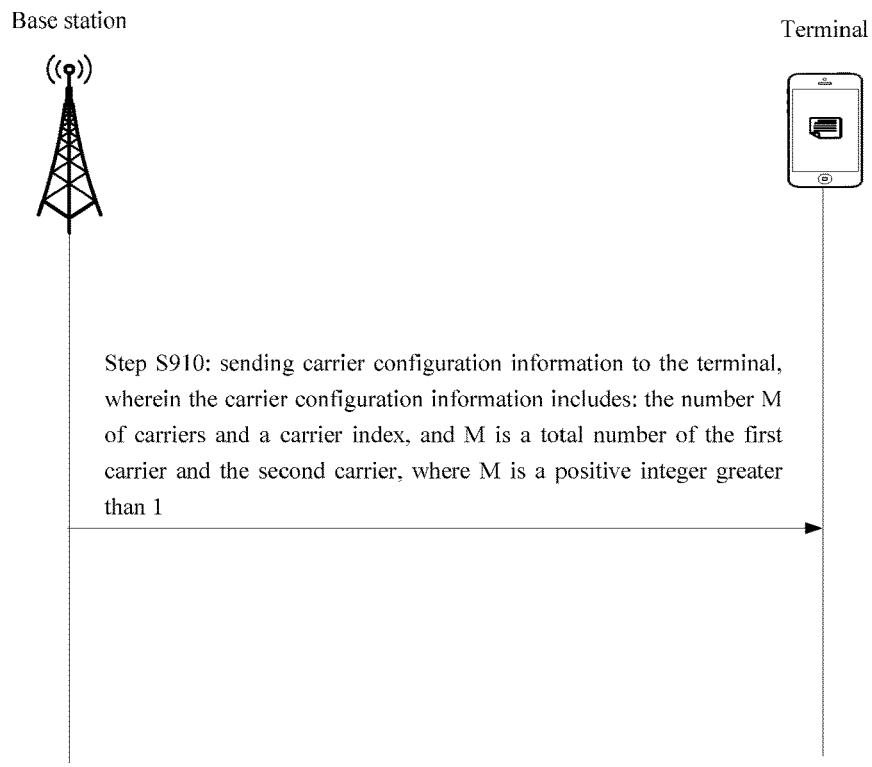
FIG. 9 is a schematic diagram of a method for HARQ-ACK feedback according to one or more examples of the present disclosure.

As shown in FIG. 9, an embodiment of the present disclosure provides a method for HARQ-ACK feedback, and the method further includes:

in step S910, carrier configuration information is sent to the terminal, and the carrier configuration information includes: the number M of carriers and a carrier index, and M is a total number of the first carrier and the second carrier, where M is a positive integer greater than 1.

In the embodiment, the carrier configuration information may be information for configuring a carrier resource used for the data transmission between the base station and the terminal by the base station. The base station can uniformly configure the number of carriers. For example, as shown in FIG. 2, four carriers are configured by the base station, which are carrier 1, carrier 2, carrier 3 and carrier 4, respectively. When performing carrier configuration, the base station selects several of the carriers to send data by indicating the carrier index in scheduling information, while no data is sent on the rest of the carriers. The carrier index may be set by an index bit. For example, when index bits are set to "001", "010", "011", "100", carriers with the carrier indexes of "001", "010", "011" and "100" can be selected to send the data.

In the embodiment, the terminal may arrange the carrier reception indication information and the HARQ-ACK information in an order of carrier indexes, and then encode the carrier reception indication information and the HARQ-ACK information, respectively, to obtain the encoded feedback information. After receiving the encoded feedback information sent by the terminal, the base station decodes the feedback information to obtain the carrier reception indication information and the HARQ-ACK information. Since the carrier reception indication information indicates that the terminal has received the downlink data on the first carrier and/or does not receive the downlink data on the second carrier, the base station can determine whether the downlink data is received on each carrier used for data transmission based on the order of carrier indexes after receiving the feedback information. For the first carrier on which the downlink data is received, the base station may further determine a specific reception condition of the downlink data on each first carrier based on the order of carrier indexes. For example, four carriers are used for downlink data transmission, each carrier is configured with eight HARQ processes, a code corresponding to the carrier reception indication information is "1011111", and a encoded sequence corresponding to the HARQ-ACK information is "11110111 11111111 01111111". The base station may determine that the carriers on which the downlink data is received by the terminal are carrier 1, carrier 3, and carrier 4, and no downlink data is received on carrier 2 based on the order of carrier indexes. In addition, based on the code corresponding to the HARQ-ACK information, the base station may determine that "11110111" is the feedback information corresponding to the HARQ processes configured on carrier 1, "11111111" is the feedback information corresponding to the HARQ processes configured on carrier 3, and "01111111" is the feedback information corresponding to the HARQ processes configured on carrier 4.

Figure 10:
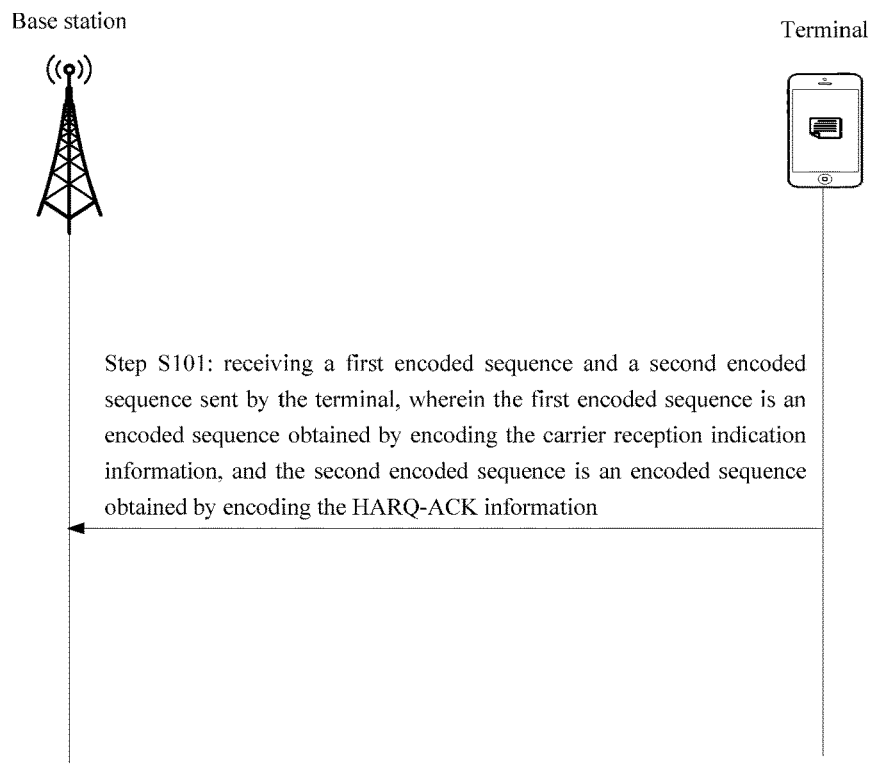
FIG. 10 is a schematic diagram of a method for HARQ-ACK feedback according to one or more examples of the present disclosure.

As shown in FIG. 10, an embodiment of the present disclosure provides a method for HARQ-ACK feedback, and the receiving the feedback information sent by the terminal in the step S710 includes:

in step S101, a first encoded sequence and a second encoded sequence sent by the terminal are received, and the first encoded sequence is an encoded sequence obtained by encoding the carrier reception indication information, the second encoded sequence is an encoded sequence obtained by encoding the HARQ-ACK information.

In the embodiment, the first encoded sequence and the second encoded sequence are encoded sequences which are separately encoded. For example, the number M of carriers=4, the number of HARQ processes on each carrier is sixteen, and there are three carriers on which the HARQ process is scheduled, then the four bits corresponding to the carrier reception indication information need to be encoded separately from the 48 bits corresponding to the HARQ-ACK information to obtain the first encoded sequence and the second encoded sequence which are different.

Here, the first encoded sequence may be encoded together with other encoded sequences other than the second encoded sequence. The first encoded sequence may also be encoded separately. Here, the separate encoding may mean that the encoding is performed so that the first encoded sequence only indicates the carrier reception indication information without indicating other types of information. Here, the carrier reception indication information and the HARQ-ACK information are encoded into the first encoded sequence and the second encoded sequence, respectively. In this way, the base station can accurately know the number of bits of the HARQ-ACK information corresponding to the second encoded sequence according to the M bits decoded from the first encoded sequence (here, taking the decoded first encoded sequence including M bits as an example), thereby enabling the correct decoding the bits of the second encoded sequence to obtain the HARQ-ACK information.

In an embodiment, the method further includes:
obtaining M bits carrying the carrier reception indication information by decoding the first encoded sequence; and
the determining that the downlink data is received on the first carrier by the terminal and/or the downlink data is not received on the second carrier by the terminal according to the carrier reception indication information includes:
when a bit in the M bits has a first bit value, determining that the downlink data is received on a first carrier corresponding to the bit by the terminal;

and/or when a bit in the M bits has a second bit value, determining that the downlink data is not received on a second carrier corresponding to the bit by the terminal.

Here, the first bit value is different from the second bit value. For example, the first bit value takes the value of "1", and the second bit value takes the value of "0". As shown in FIG. 2, when the first encoded sequence corresponds to four bits and is encoded as "1110", after receiving the encoded sequence sent by the terminal, the base station can determine a condition of receiving the downlink data on carrier 1, carrier 2, carrier 3 and carrier 4 by the terminal based on different values of respective bits of the first encoded sequence. Here, since the code is "1110", the base station can determine that the terminal has received the downlink data on carrier 1, carrier 2 and carrier 3, and the terminal does not receive the downlink data on carrier 4.

In an embodiment, the method further includes:
obtaining the HARQ-ACK information by decoding the second encoded sequence;
the determining the reception condition of the downlink data received on the first carrier according to the HARQ-ACK information includes:
determining the reception condition of the downlink data received on the first carrier according to the HARQ-ACK information sorted according to an ascending order of a carrier index of the first carrier.

In the embodiment, the HARQ-ACK information corresponding to the first carrier is sorted according to an ascending order of a carrier index of the first carrier. Here, the HARQ-ACK information corresponding to the first carrier is sorted according to the ascending order of the carrier index of the first carrier. For example, carrier indexes of first carriers are "001", "010" and "011", the HARQ-ACK information corresponding to the first carrier with the carrier index "001" is "01111111", the HARQ-ACK information corresponding to the first carrier with the carrier index "010" is "11111111", and the HARQ-ACK information corresponding to the first carrier with the carrier index "011" is "11110111". Then the encoded sequence of the HARQ-ACK information obtained by sorting the HARQ-ACK information corresponding to the first carrier according to the ascending order of the carrier indexes of the first carriers is "01111111 11111111 11110111". The HARQ-ACK information is sorted according to the ascending order of the carrier indexes of the first carriers to facilitate the decoding by the base station. The HARQ-ACK information of each first carrier is accurately obtained based on the order of the carrier indexes.

Figure 11:
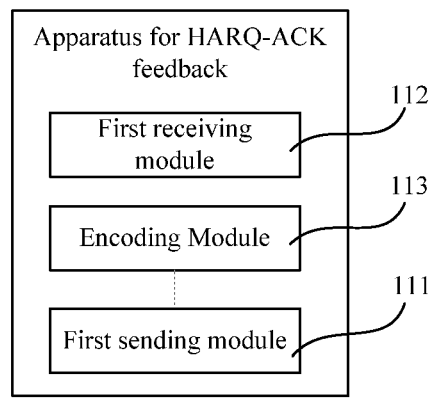
FIG. 11 is a schematic diagram of an apparatus for HARQ-ACK feedback according to one or more examples of the present disclosure.

As shown in FIG. 11, an embodiment of the present disclosure provides an apparatus for HARQ-ACK feedback, and the apparatus includes a first sending module 111.

The first sending module 111 is configured to send feedback information to a base station according to a reception condition of downlink data, and the feedback information includes carrier reception indication information and HARQ-ACK information; and the carrier reception indication information is used to indicate that the downlink data is received on a first carrier by a terminal and/or the downlink data is not received on a second carrier by the terminal; and the HARQ-ACK information is feedback information of the downlink data received on the first carrier.

In an embodiment, the apparatus further includes a first receiving module 112.

The first receiving module 112 is configured to receive HARQ process configuration information sent by the base station, and the HARQ process configuration information is used to indicate the number N of HARQ processes configured on the first carrier and the second carrier, respectively, where N is a positive integer greater than 1; and the HARQ-ACK information is feedback information of N HARQ processes on the first carrier.

In an embodiment, the first receiving module 112 is further configured to receive carrier configuration information sent by the bases station, and the carrier configuration information includes: the number M of carriers and a carrier index, and M is a total number of the first carrier and the second carrier, where M is a positive integer greater than 1.

In an embodiment, the apparatus further includes an encoding module 113.

The encoding module 113 is configured to obtain a first encoded sequence by encoding the carrier reception indication information; and obtain a second encoded sequence by encoding the HARQ-ACK information; and the first sending module 111 is configured to send the first encoded sequence and the second encoded sequence to the base station.

In an embodiment, the carrier reception indication information includes M bits;
a bit in the M bits corresponding to the first carrier has a first bit value; and
a bit in the M bits corresponding to the second carrier has a second bit value.

In an embodiment, HARQ-ACK information corresponding to the first carrier is sorted according to an ascending order of a carrier index of the first carrier.

Figure 12:
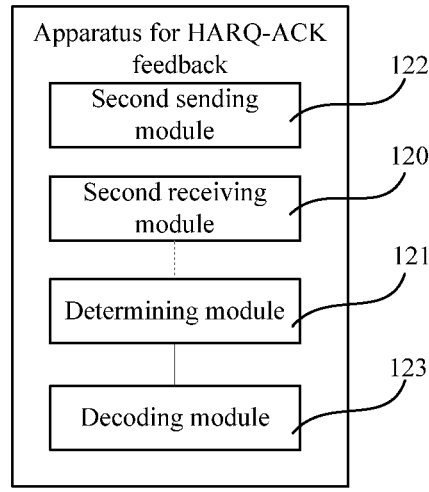
FIG. 12 is a schematic diagram of an apparatus for HARQ-ACK feedback according to one or more examples of the present disclosure.

As shown in FIG. 12, an embodiment of the present disclosure provides an apparatus for HARQ-ACK feedback, and the apparatus includes a second receiving module 120 and a determining module 121.

The second receiving module 120 is configured to receive feedback information sent by the terminal, and the feedback information includes carrier reception indication information and HARQ-ACK information; and the determining module 121 is configured to determine that downlink data is received on a first carrier by a terminal and/or the downlink data is not received on a second carrier by the terminal according to the carrier reception indication information, and determine a reception condition of the downlink data received on the first carrier according to the HARQ-ACK information In an embodiment, the apparatus further includes a second sending module 122.

The second sending module 122 is configured to send HARQ process configuration information to the terminal, and the HARQ process configuration information is used to indicate the number N of HARQ processes configured on the first carrier and the second carrier, respectively, where N is a positive integer greater than 1; and the HARQ-ACK information is feedback information of N HARQ processes on the first carrier.

In an embodiment, the second sending module 122 is further configured to send carrier configuration information to the terminal, and the carrier configuration information includes: the number M of carriers and a carrier index, and M is a total number of the first carrier and the second carrier, where M is a positive integer greater than 1.

In an embodiment, the second receiving module 120 is further configured to receive a first encoded sequence and a second encoded sequence sent by the terminal, and the first encoded sequence is an encoded sequence obtained by encoding the carrier reception indication information, and the second encoded sequence is an encoded sequence obtained by encoding the HARQ-ACK information.

In an embodiment, the apparatus further includes a decoding module 123.

The decoding module 123 is configured to obtain M bits carrying the carrier reception indication information by decoding the first encoded sequence; and the determining module 121 is further configured to, when a bit in the M bits has a first bit value, determine that the downlink data is received on a first carrier corresponding to the bit by the terminal;

and/or when a bit in the M bits has a second bit value, determine that the downlink data is not received on a second carrier corresponding to the bit by the terminal.

In an embodiment, the decoding module is further configured to obtain the HARQ-ACK information by decoding the second encoded sequence; and the determining module 122 is further configured to determine the reception condition of the downlink data received on the first carrier according to HARQ-ACK information sorted according to an ascending order of a carrier index of the first carrier.

The embodiments of the present disclosure also provide a communication device, including:

an antenna;

a memory; and a processor, coupled to the antenna and the memory, respectively, configured to control the antenna to send and receive a wireless signal by executing an executable program stored on the memory, and capable of executing steps of the method for HARQ-ACK feedback provided by any of the foregoing embodiments.

The communication device provided in the embodiments may be the aforementioned terminal or base station. The terminal may be various human-mounted terminals or vehicle-mounted terminals. The base station may be various types of base stations, for example, a 4G base station or a 5G base station.

The antenna may be various types of antennas, for example, a mobile antenna such as a 3G antenna, a 4G antenna, or a 5G antenna; and the antenna may also include a WiFi antenna or a wireless charging antenna.

The memory may include various types of storage mediums, which is a non-transitory computer storage medium that can continue to memorize information stored on it after the communication device is powered off.

The processor may be connected to the antenna and the memory through a bus or the like, and may be configured to read the executable program stored in the memory, to execute, for example, at least one of the methods shown in FIG. 3 to FIG. 10.

Figure 13:
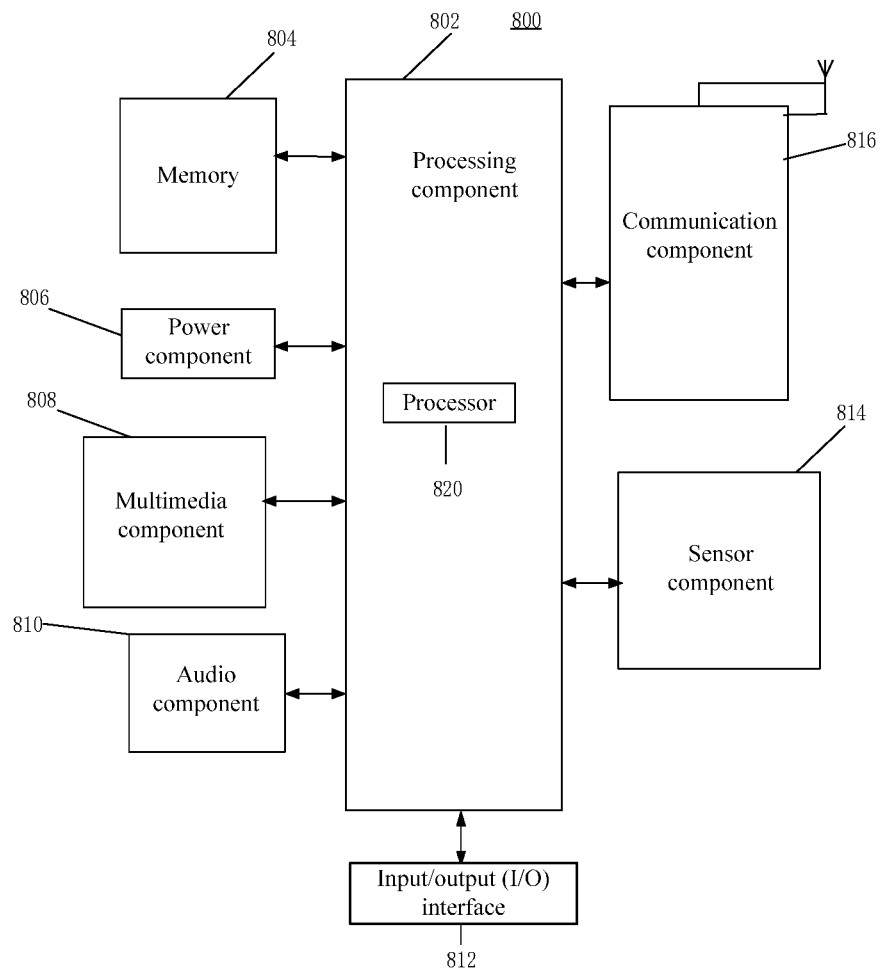
FIG. 13 is a schematic structural diagram of a terminal according to one or more examples of the present disclosure.

As shown in FIG. 13, an embodiment of the present disclosure provides a structure of a terminal.

Reference is made to a terminal 800 shown in FIG. 13. The embodiment provides the terminal 800, which may specifically be a mobile phone, a computer, a digital broadcast terminal, a messaging apparatus, a gaming console, a tablet, a medical apparatus, exercise equipment, a personal digital assistant, etc.

Referring to FIG. 13, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other apparatus. The terminal 800 may access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the terminal 800 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described methods.

In an embodiment, there is also provided a non-transitory computer readable storage medium including instructions, such as the memory 804 including instructions, the above instructions may be executed by the processor 820 in the terminal 800 for performing the above-described methods. For example, the non-transitory computer-readable storage medium may be a ROM, a Random Access Memory (RAM), a CD-ROM, a magnetic tape, a floppy disc, an optical data storage device, and the like.

The terminal may be configured to implement the aforementioned methods, for example, the methods shown in FIG. 3 to FIG. 10.

Figure 14:
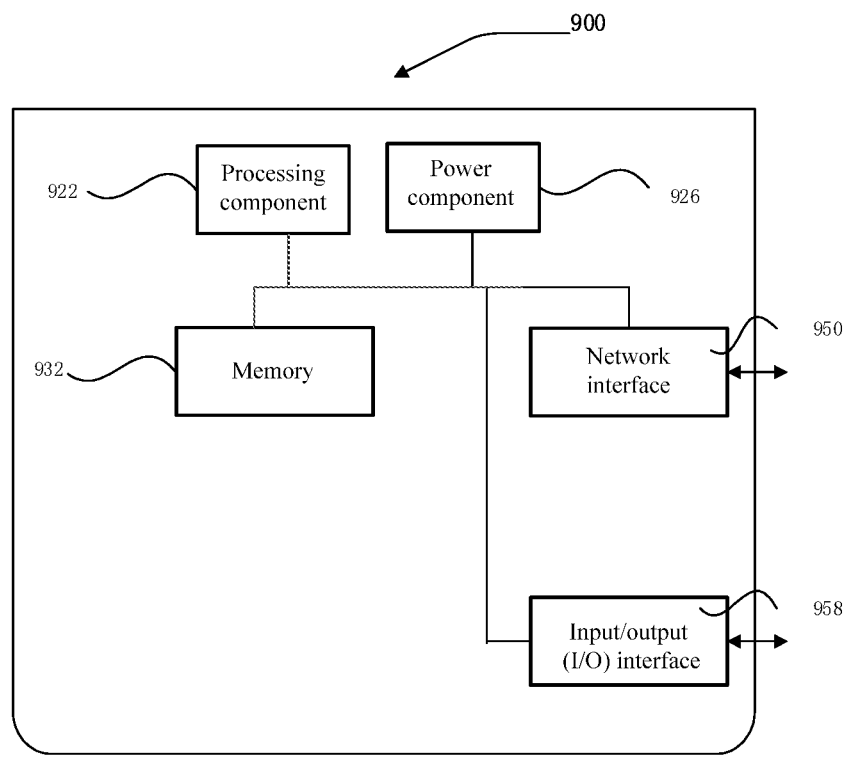
FIG. 14 is a schematic structural diagram of a base station according to one or more examples of the present disclosure.

As shown in FIG. 14, an embodiment of the present disclosure provides a structure of a base station. For example, the base station 900 may be provided as a network-side device. Referring to FIG. 14, the base station 900 includes a processing component 922, which further includes one or more processors and a memory resource represented by a memory 932 for storing instructions executable by the processing component 922, such as an application program. The application program stored in the memory 932 may include one or more modules, each corresponding to a set of instructions. In addition, the processing component 922 is configured to execute the instructions to execute any of the aforementioned methods, such as the methods shown in FIGS. 2, 5, 6, 7 and 8.

The base station 900 may also include: a power component 926 configured to perform power management of the base station 900, a wired or wireless network interface 950 configured to connect the base station 900 to the network, and an input/output (I/O) interface 958. The base station 900 may operate an operating system stored in the memory 932, such as Windows Server™, Mac OS X™, Unix™, Linux™, FreeBSD™, or the like.

The wireless network interface 950 includes, but is not limited to, the antenna of the aforementioned communication device. Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for Hybrid Automatic Repeat Request Acknowledgement (HARQ-ACK) feedback, comprising:
   sending, by a terminal, feedback information according to a reception condition of downlink data, wherein the feedback information comprises carrier reception indication information and HARQ-ACK information;
   wherein the carrier reception indication information is configured to indicate at least one of followings: the downlink data is received on a first carrier by the terminal or the downlink data is not received on a second carrier by the terminal; and the HARQ-ACK information comprises feedback information of the downlink data received on the first carrier;
   wherein one or more bits is used by the carrier reception indication information for indicating one or more carriers;
   wherein in a case where a first bit in the carrier reception indication information corresponding to the first carrier has a first bit value, and the HARQ-ACK information comprises HARQ-ACK feedback information of all HARQ-ACK processes on the first carrier corresponding to the first bit;
   wherein in a case where a second bit in the carrier reception indication information corresponding to the second carrier has a second bit value, and the HARQ-ACK information does not comprise HARQ-ACK feedback information of any HARQ-ACK process on the second carrier corresponding to the second bit.

2. The method according to claim 1, further comprising:
   receiving Hybrid Automatic Repeat Request (HARQ) process configuration information, wherein the HARQ process configuration information is to indicate the number N of HARQ processes configured on the first carrier and the second carrier, respectively, wherein N is a positive integer greater than 1; and wherein the HARQ-ACK information comprises feedback information of N HARQ processes on the first carrier.

3. The method according to claim 1, further comprising:
receiving carrier configuration information, wherein the carrier configuration information comprises: a number M of carriers and a carrier index, and M is a total number of the first carrier and the second carrier, wherein M is a positive integer greater than 1.

4. The method according to claim 3, further comprising:
obtaining a first encoded sequence by encoding the carrier reception indication information; and
obtaining a second encoded sequence by encoding the HARQ-ACK information; and
wherein sending the feedback information comprises:
sending the first encoded sequence and the second encoded sequence.

5. The method according to claim 3, wherein the carrier reception indication information comprises M bits; wherein
the bits in the M bits corresponding to the first carrier have the first bit value; and
the bits in the M bits corresponding to the second carrier have the second bit value.

6. The method according to claim 4, wherein the HARQ-ACK information corresponding to the first carrier is sorted according to an ascending order of a carrier index of the first carrier.

7. A method for Hybrid Automatic Repeat Request Acknowledgement (HARQ-ACK) feedback, comprising:
receiving, by a base station, feedback information, wherein the feedback information comprises carrier reception indication information and HARQ-ACK information;
wherein one or more bits is used by the carrier reception indication information for indicating one or more carriers;
wherein in a case where a first bit in the carrier reception indication information corresponding to a first carrier has a first bit value, and the HARQ-ACK information comprises HARQ-ACK feedback information of all HARQ-ACK processes on the first carrier corresponding to the first bit;
wherein in a case where a second bit in the carrier reception indication information corresponding to a second carrier has a second bit value, and the HARQ-ACK information does not comprise HARQ-ACK feedback information of any HARQ-ACK process on the second carrier corresponding to the second bit;
determining, by the base station, that downlink data is received on the first carrier by a terminal or the downlink data is not received on the second carrier by the terminal according to the carrier reception indication information; and
determining a reception condition of the downlink data received on the first carrier according to the HARQ-ACK information.

8. The method according to claim 7, further comprising:
sending Hybrid Automatic Repeat Request (HARQ) process configuration information, wherein the HARQ process configuration information is to indicate the number N of HARQ processes configured on the first carrier and the second carrier, respectively, wherein N is a positive integer greater than 1; and
wherein the HARQ-ACK information comprises feedback information of N HARQ processes on the first carrier.

9. The method according to claim 7, further comprising:
sending carrier configuration information, wherein the carrier configuration information comprises: a number M of carriers and a carrier index, and M is a total number of the first carrier and the second carrier, wherein M is a positive integer greater than 1.

10. The method according to claim 9, wherein receiving the feedback information comprises:
receiving a first encoded sequence and a second encoded sequence, wherein the first encoded sequence is an encoded sequence obtained by encoding the carrier reception indication information, and the second encoded sequence is an encoded sequence obtained by encoding the HARQ-ACK information.

11. The method according to claim 10, further comprising:
obtaining M bits carrying the carrier reception indication information by decoding the first encoded sequence; and
the determining that the downlink data is received on the first carrier by the terminal and/or the downlink data is not received on the second carrier by the terminal according to the carrier reception indication information comprises:
in a case where the bits in the M bits have the first bit value, determining that the downlink data is received on the first carrier corresponding to the first bit by the terminal; or
in a case where the bits in the M bits have the second bit value, determining that the downlink data is not received on the second carrier corresponding to the second bit by the terminal.

12. The method according to claim 10, further comprising:
obtaining the HARQ-ACK information by decoding the second encoded sequence; and
wherein determining the reception condition of the downlink data received on the first carrier according to the HARQ-ACK information comprises:
determining the reception condition of the downlink data received on the first carrier according to the HARQ-ACK information sorted according to an ascending order of a carrier index of the first carrier.

13. A terminal, comprising:
an antenna;
a memory; and
a processor, coupled to the antenna and the memory, respectively, and configured to control transmission and reception of the antenna by executing computer-executable instructions stored on the memory,
wherein the processor is further configured to:
send feedback information according to a reception condition of downlink data, wherein the feedback information comprises carrier reception indication information and Hybrid Automatic Repeat Request Acknowledgement (HARQ-ACK) information; and
wherein the carrier reception indication information is configured to indicate that the downlink data is received on a first carrier by the terminal and/or the downlink data is not received on a second carrier by the terminal; and the HARQ-ACK information comprises feedback information of the downlink data received on the first carrier;
wherein one or more bits is used by the carrier reception indication information for indicating one or more carriers;

wherein in a case where a first bit in the carrier reception indication information corresponding to the first carrier has a first bit value, and the HARQ-ACK information comprises HARQ-ACK feedback information of all HARQ-ACK processes on the first carrier corresponding to the first bit;

wherein in a case where a second bit in the carrier reception indication information corresponding to the second carrier has a second bit value, and the HARQ-ACK information does not comprise HARQ-ACK feedback information of any HARQ-ACK process on the second carrier corresponding to the second bit.

14. The terminal according to claim 13, wherein the processor is further configured to receive carrier configuration information, and wherein the carrier configuration information comprises: the number M of carriers and a carrier index, and M is a total number of the first carrier and the second carrier, wherein M is a positive integer greater than 1.

15. The terminal according to claim 14, wherein the processor is further configured to:

obtain a first encoded sequence by encoding the carrier reception indication information, and obtain a second encoded sequence by encoding the HARQ-ACK information; and send the first encoded sequence and the second encoded sequence.

16. The terminal according to claim 14, wherein the carrier reception indication information comprises M bits;

the bits in the M bits corresponding to the first carrier have the first bit value; and the bits in the M bits corresponding to the second carrier have the second bit value.

17. A network device, comprising:
an antenna;
a memory; and
a processor, coupled to the antenna and the memory, respectively, and configured to control transmission and reception of the antenna by executing computer-executable instructions stored on the memory, wherein the processor is further configured to perform the method according to claim 7.

18. The network device according to claim 17, wherein the processor is further configured to send carrier configuration information, wherein the carrier configuration information comprises: a number M of carriers and a carrier index, and M is a total number of the first carrier and the second carrier, wherein M is a positive integer greater than 1.

19. The network device according to claim 18, wherein the processor is configured to receive a first encoded sequence and a second encoded sequence, wherein the first encoded sequence is an encoded sequence obtained by encoding the carrier reception indication information, and the second encoded sequence is an encoded sequence obtained by encoding the HARQ-ACK information.

20. The network device according to claim 19, wherein the processor is further configured to:

obtain M bits carrying the carrier reception indication information by decoding the first encoded sequence; and in a case where the bits in the M bits have the first bit value, determine that the downlink data is received on the first carrier corresponding to the first bit by the terminal, or in a case where the bits in the M bits have the second bit value, determine that the downlink data is not received on the second carrier corresponding to the second bit by the terminal.

* * * * *